US009896210B2

(12) United States Patent
Noda et al.

(10) Patent No.: US 9,896,210 B2
(45) Date of Patent: Feb. 20, 2018

(54) DISPLAY UNIT

(71) Applicant: Panasonic Intellectual Property Management Co., Ltd., Osaka (JP)

(72) Inventors: Yuki Noda, Osaka (JP); Keijiroh Nagano, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/990,305

(22) Filed: Jan. 7, 2016

(65) Prior Publication Data

US 2016/0226411 A1 Aug. 4, 2016

(30) Foreign Application Priority Data

Jan. 29, 2015 (JP) ................................ 2015-014878
Dec. 15, 2015 (JP) ................................ 2015-244054

(51) Int. Cl.
*H02P 6/16* (2016.01)
*B64D 11/00* (2006.01)
*H02P 7/03* (2016.01)

(52) U.S. Cl.
CPC ................ *B64D 11/00* (2013.01); *H02P 7/03* (2016.02)

(58) Field of Classification Search
CPC .................................. H02P 6/16; H02P 21/22
See application file for complete search history.

(56) References Cited

U.S. PATENT DOCUMENTS 6,695,376 B1 * 2/2004 Hirano ................ B60R 11/0235 248/921
7,379,125 B2 * 5/2008 Chang ................ B60R 11/0235 296/37.7
7,762,627 B2 * 7/2010 Chang ................ B60R 11/0235 297/217.1
8,436,951 B2 * 5/2013 Chen .................. B60R 11/0235 248/333
2006/0082944 A1 * 4/2006 Koyanagi ................ H02H 3/04 361/93.1
2006/0203135 A1 * 9/2006 Myers ................ B60R 11/0235 348/825
2006/0265958 A1 * 11/2006 Cheramy ................ E05D 15/00 49/350
2007/0119790 A1 * 5/2007 Yoshinaka .......... B60R 11/0235 211/4

(Continued)

FOREIGN PATENT DOCUMENTS

JP 2004/237895 A * 8/2004
JP 2009-214819 9/2009

*Primary Examiner* — Kawing Chan
(74) *Attorney, Agent, or Firm* — McDermott Will & Emery LLP

(57) ABSTRACT

The display unit of the present disclosure has a main unit, a display disposed on the main unit so as to be movable between a first position and a second position, a motor for driving the display, a driving state detector for detecting the driving state of the motor, a current detector for detecting motor current, and a controller for controlling the driving state of the motor. When the current detector detects a predetermined current value suitable for the driving state detected by the driving state detector, the controller provides the motor with a predetermined drive control.

10 Claims, 5 Drawing Sheets

(56) References Cited

U.S. PATENT DOCUMENTS

2009/0115356 A1* 5/2009 Kawasoe ............ B60R 11/0235
318/48
2011/0036508 A1* 2/2011 Lin ........................ B60J 1/2016
160/7
2011/0271592 A1* 11/2011 Yamada ............... G11B 33/027
49/27

* cited by examiner

DISPLAY UNIT

BACKGROUND

1. Technical Field

The present disclosure relates to a display unit having a display whose position is changeable.

2. Description of the Related Art

The structure disclosed in Patent Literature 1 is the display unit capable of preventing faulty operation. According to the display unit, detecting that the display panel has no rotational movement and the motor has no rotation, it controls the motor in a predetermined manner. On the other hand, detecting that the display panel has no rotational movement but the motor is rotating, it determines occurrence of backlash and keeps the motor driving. With the drive control above, the display unit prevents faulty operation.

CITATION LIST

Patent Literature

PTL 1: Japanese Unexamined Patent Application Publication No. 2009-214819

SUMMARY

The present disclosure provides a display unit effectively reduces an impact on the unit caused by an accidental collision between a person or an object and the unit.

The display unit of the present disclosure has a main unit, a display disposed on the main unit so as to be movable between a first position and a second position, a motor for driving the display, a driving state detector for detecting the driving state of the motor, a current detector for detecting motor current, and a controller for controlling the driving state of the motor. When the current detector detects a predetermined current value suitable for the driving state detected by the driving state detector, the controller provides the motor with a predetermined drive control.

The display unit of the present disclosure effectively reduces an impact on the unit caused by an accidental collision between a person or an object and the unit.

DETAILED DESCRIPTION OF THE PREFERRED EMBODIMENTS

Hereinafter, exemplary embodiments will be described in detail, with reference to the accompanying drawings. However, details beyond necessity (for example, descriptions on well-known matters or on substantially identical structures) may be omitted to eliminate redundancy from the description below for easy understanding of those skilled in the art.

It is to be understood that the accompanying drawings and the description below are for purposes of full understanding of those skilled in the art and are not to be construed as limitation on the scope of the claimed disclosure.

First Exemplary Embodiment

1. Structure of Display Unit

Figure 1:
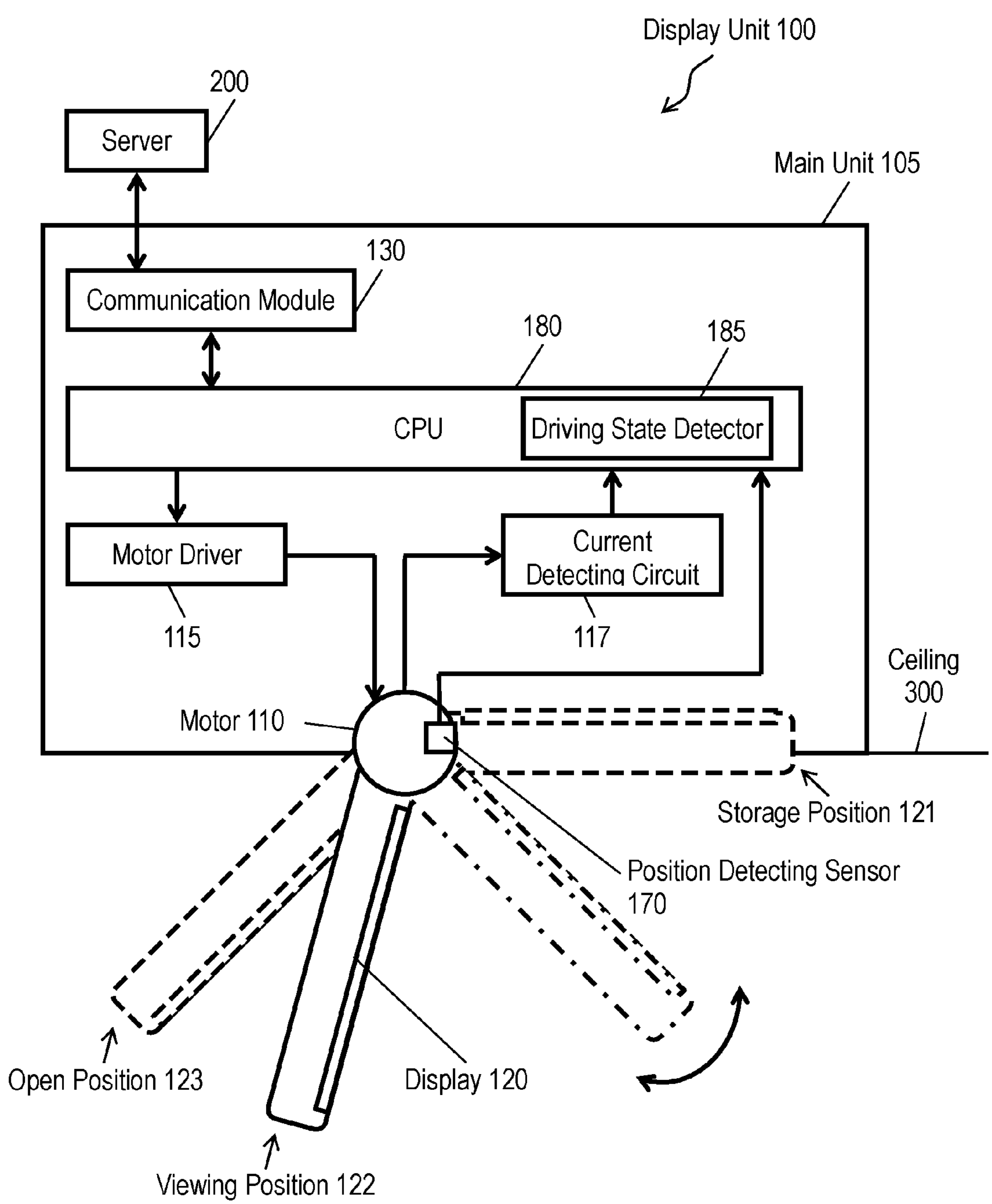
FIG. 1 is a block diagram showing the structure of a display unit in accordance with a first exemplary embodiment.

FIG. 1 is a block diagram showing the structure of a display unit of the first exemplary embodiment. Main unit 105 of display unit 100 is mounted, for example, on ceiling 300 of an airplane's cabin above the passengers' seats. However, the installation position of display unit 100 is not limited to a ceiling; it may be disposed on a wall, or main unit 105 may be placed on the floor.

Display unit 100 has main unit 105, display 120, motor 110, CPU 180, motor driver 115, current detecting circuit 117, and position detecting sensor 170.

Main unit 105 of display unit 100 is mounted on ceiling 300 of an airplane. Main unit 105 accommodates CPU 180, motor driver 115, and current detecting circuit 117.

Display 120 is disposed on main unit 105 so as to have rotational movement. Receiving data sent from server 200, display 120 shows image.

Motor 110 is disposed at the joint between main unit 105 and display 120. Motor 110 rotates display 120 on a rotary shaft in open/close directions with respect to main unit 105. The rotary shaft, which is rotationally driven by motor 110, is fixed to an end of display 120 and holds the display to main unit 105. Motor 110 gives rotative force to the rotary shaft so that display 120 has an open movement from storage position 121 to viewing position 122 and has a close movement from viewing position 122 to storage position 121. Motor 110 stops its rotation at the moment on which display 120 has reached viewing position 122 from storage position 121; similarly, motor 110 stops its rotation at the moment on which display 120 has reached storage position 121 from viewing position 122.

Storage position 121 is a position that display 120 comes closest to main unit 105, or may be a recess formed in main unit 105 in which display 120 is accommodated therein. In the structure where main unit 105 of display unit 100 is embedded in ceiling 300 of an airplane, storage position 121 is a position that display 120 comes closest ceiling 300, or also may be a position that display 120 is accommodated in ceiling 300. Viewing position 122 is a position that the passengers can view the screen of display 120. Viewing position 122 may be a position that display 120 rotates on the rotary shaft 90° or more away from storage position 121.

FIG. 1 shows each position of display 120 as follows: full lines show display 120 positioned at viewing position 122; broken lines show it positioned at storage position 121; and dashed-dotted lines show it positioned between storage position 121 and viewing position 122. Display unit 100 may be structured so that display 120 can be rotated, beyond viewing position 122, to open position 123 shown by broken lines in FIG. 1. Open position 123 is a position that display 120 further rotates beyond viewing position 122 in the open direction.

Motor driver 115 is the circuit that, in response to instructions from CPU 180, supplies motor 110 with electrical power necessary for the rotation of motor 110 and controls the direction of the rotation of motor 110.

Current detecting circuit 117 detects the current that motor 110 carries, and sends the detected current value to CPU 180. A current value includes the magnitude of current (as an absolute value) and flow directions (as polarity).

Position detecting sensor 170, which is mounted on motor 110, detects an open/close position and sends the position data to CPU 180. The open/close position is data that indicates an open degree of display 120 with respect to main unit 105. The open/close position may be represented by an angle of display 120 with respect to main unit 105. In the exemplary embodiment, the open/close position represents a position in the range from storage position 121 to open position 123. For example, a photo sensor may be employed for position detecting sensor 170.

CPU 180 executes a program stored in memory (not shown) and controls display unit 100. CPU 180 receives open/close instructions sent from server 200 via communication module 130, and according to the instructions, it requests motor driver 115 to control the open/close movement of display 120. Specifically, in the open movement of display 120, when CPU 180 receives from position detecting sensor 170 a notice that display 120 has reached viewing position 122, it requests motor driver 115 to stop motor 110. Similarly, in the close movement of display 120, when CPU 180 receives from position detecting sensor 170 a notice that display 120 has reached storage position 121, it requests motor driver 115 to stop motor 110.

CPU 180 also works as driving state detector 185 for detecting the driving state of motor 110 according to the open/close instructions sent from server 200, the current value of motor 110 sent from current detecting circuit 117, and the position data of display 120 sent from position detecting sensor 170. Driving state detector 185 monitors the driving state of motor 110, i.e., whether it has no rotation or it is rotating in the direction of open operation (in the open direction) or in the direction of close operation (in the close direction). That is, the data on the driving state of motor 110 enables driving state detector 185 to detect the state of display 120, i.e., whether it remains stationary or it is moving in the open/close direction.

The open/close instructions for display 120 are not necessarily fed from server 200; an operation terminal, such as an infrared remote-control unit, may outputs them to display unit 100, or the instructions may be given by operating the operating section disposed on display unit 100.

Current detecting circuit 117 is an example of a current detector. CPU 180 is an example of a controller. Viewing position 122 and storage position 121 are examples of a first position and a second position, respectively. Position detecting sensor 170 is an example of a position detector.

2. Workings of Display Unit

Receiving the open/close instructions sent from server 200 to CPU 180, display unit 100 opens or closes display 120. Display 120 remains stationary unless server 200 outputs open/close instructions.

2-1. Open Operation of Display Unit

First, the description below is on the workings of the display unit when CPU 180 receives the open instruction from server 200 to display 120 placed at storage position 121.

Figure 2:
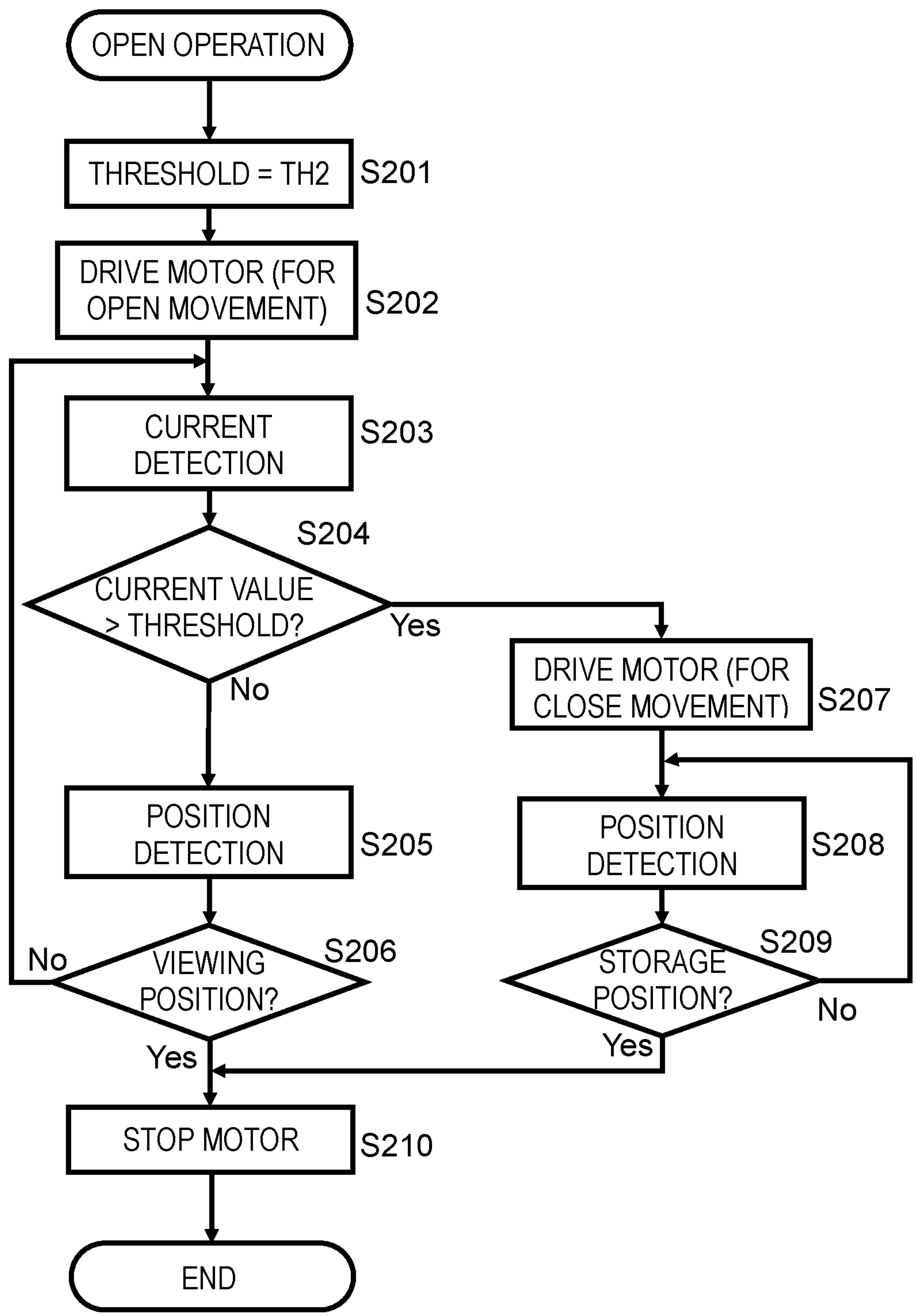
FIG. 2 is a flowchart illustrating the procedure of open operation of the display unit in accordance with the first exemplary embodiment.

FIG. 2 is a flowchart illustrating the procedure of open operation of display unit 100 of the exemplary embodiment. The procedure—in which display unit 100 moves display 120 in the open direction in response to the open instruction from server 200—will be described with reference to FIG. 2.

Figure 3:
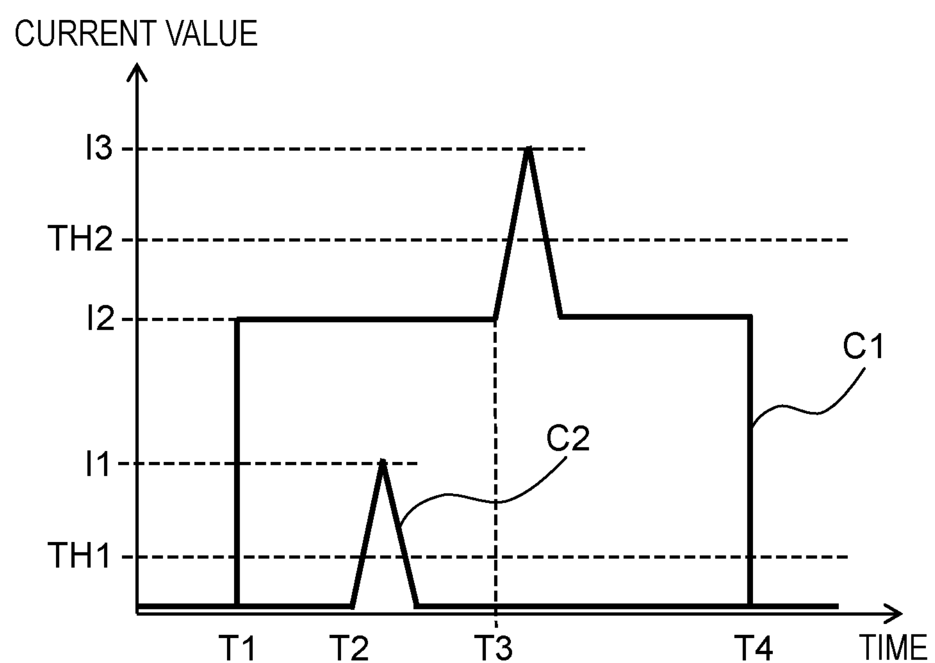
FIG. 3 is a graph illustrating the threshold setting of motor drive current of the display unit of the first exemplary embodiment.

Receiving the open instruction from server 200, CPU 180 determines a current threshold value detected by current detecting circuit 117 as threshold TH2 (step S201). The setting way of threshold TH2 will be described below with reference to FIG. 3. FIG. 3 illustrates the threshold setting of motor drive current of display unit 100 of the exemplary embodiment. In FIG. 3, the horizontal axis represents time and the vertical axis represents current that flows in motor 110.

Graph C1 is an example of current transition in motor 110 in response to the open movement of display 120. Specifically, graph C1 shows a change in the current value from time T1 at which display 120 starts the open movement to time T4 at which the open movement ends. Suppose that, at time T3 in the open movement, display 120 undergoes an external force exerted in a direction opposite to the open movement. At the moment, current that flows in motor 110 becomes higher than a current value with no external force exerted. As shown in graph C1 of FIG. 3, when display 120 has no external force, motor 110 carries current value I2, and when display 120 undergoes an external force in a direction opposite to the open movement at time T3, current value I2 increases to value I3. Taking such a case—in which an external force is applied to display 120 in a direction opposite to the open movement—into account, current threshold value TH2 is determined so as to be higher than current value I2 (in the case with no external force applied) and so as to be lower than current value I3 (in the case with external force applied), as shown in FIG. 3.

In step S202 of FIG. 2, CPU 180 gives instructions to motor driver 115 to start the open movement of display 120. Receiving the instructions, motor driver 115 starts power supply to motor 110 so that display 120 moves from storage position 121 to viewing position 122. This allows display 120 to start the open movement. During the open movement of display 120, current detecting circuit 117 detects current that motor 110 carries, and CPU 180 reads the detected current value (step S203). In step S204, CPU 180 compares the current value detected by current detecting circuit 117 with threshold TH2.

If the current value detected by current detecting circuit 117 is not more than threshold TH2 (corresponding to 'No' in step S204), display 120 continues the open movement. At that time, CPU 180 reads the position of display 120 detected by position detecting sensor 170 (in step S205), and determines whether display 120 has reached viewing position 122 or not (in step S206).

If display 120 does not yet reach viewing position 122 (corresponding to 'No' in step S206), the procedure goes back to step S203 for current detection. If display 120 has reached viewing position 122 (corresponding to 'Yes' in step S206), CPU 180 gives instructions to motor driver 115 so as to stop motor 110 (in step S210). The open movement of display 120 is thus completed.

On the other hand, in step S204, the current value detected by current detecting circuit 117 is greater than threshold TH2 (corresponding to 'Yes'), CPU 180 provides motor 110 with reverse rotation. That is, CPU 180 stops the open movement of display 120 and requests motor driver 115 so as to start the close movement of display 120 (in step S207). Receiving the request, motor driver 115 starts to supply motor 110 with electric power so that display 120 moves to storage position 121 from the current position. Display 120 starts the close movement. For example, if an external force in the close direction is exerted on display 120 during its open movement, an amount of current greater than threshold TH2 can be generated. In that case, in step S207, display 120 moves in the direction in which the external force is applied, i.e., moves in the close direction.

During the close movement of display 120, CPU 180 reads the position of display 120 detected by position detecting sensor 170 (in step S208), and determines whether display 120 has reached storage position 121 or not (in step S209).

If display 120 does not yet reach storage position 121 (corresponding to 'No' in step S209), the procedure goes back to step S208 where CPU 180 detects the position of display 120.

If display 120 has reached storage position 121 (corresponding to 'Yes' in step S209), CPU 180 gives instructions to motor driver 115 so as to stop motor 110 (in step S210). The close movement of display 120 is thus completed.

2-2. Close Operation of Display Unit

Next, the description below is on the workings of the display unit when CPU 180 receives the close instruction from server 200 to display 120 placed at viewing position 122.

When display unit 100 performs the close movement of display 120 in response to the close instruction from server 200, the procedure is similar to the flowchart of FIG. 2 that describes the open operation of display unit 100; except for that the open movement is replaced with the close movement and viewing position 122 is replaced with storage position 121 in the flowchart. That is, when display unit 100 performs the close operation, the motor drive in step S202 of FIG. 2 is for the close movement, whereas the motor drive in step S207 is for the open movement. For example, if an external force in the open direction is exerted on display 120 during its close movement, an amount of current greater than threshold TH2 can be generated. In that case, in step S207, display 120 moves in the direction in which the external force is applied, i.e., moves in the open direction.

Besides, in the close operation of display unit 100, in step S206, CPU 180 determines whether display 120 has reached storage position 121 or not, and in step S209, it determines whether display 120 has reached viewing position 122 or not. If display 120 does not yet reach storage position 121 (corresponding to 'No' in step S206), the procedure goes back to step S203 where CPU 180 detects current. If display 120 does not yet reach viewing position 122 (corresponding to 'No' in step S209), the procedure goes back to step S208 where CPU 180 detects the position of display 120. If display 120 has reached storage position 121 (corresponding to 'Yes' in step S206) or if display 120 has reached viewing position 122 (corresponding to 'Yes' in step S209), CPU 180 gives instructions to motor driver 115 so as to stop motor 110 (in step S210). The close movement of display 120 is thus completed. As for other operations, they are similar to the aforementioned open operation and detailed description thereof will be omitted.

In the open operation of display unit 100, the current flow in motor 110 is opposite from that in the close operation; CPU 180 compares between the current value detected by current detecting circuit 117 and threshold TH2 (in step S204 of FIG. 2), using the absolute value of the current. Threshold TH2 shown in FIG. 2 and FIG. 3 is not necessarily to be common in the open operation and in the close operation. For example, when display unit 100 is amounted on ceiling 300 shown in FIG. 1, due to the effect of gravity on display 120, the current that flows in motor 110 for driving display 120 in the close operation tends to be greater (as an absolute value) than that in the open operation. In that case, threshold TH2 in the close operation may be set to a value greater than that in the open operation.

2-3. Operation on the Display Remaining Stationary

Figure 4:
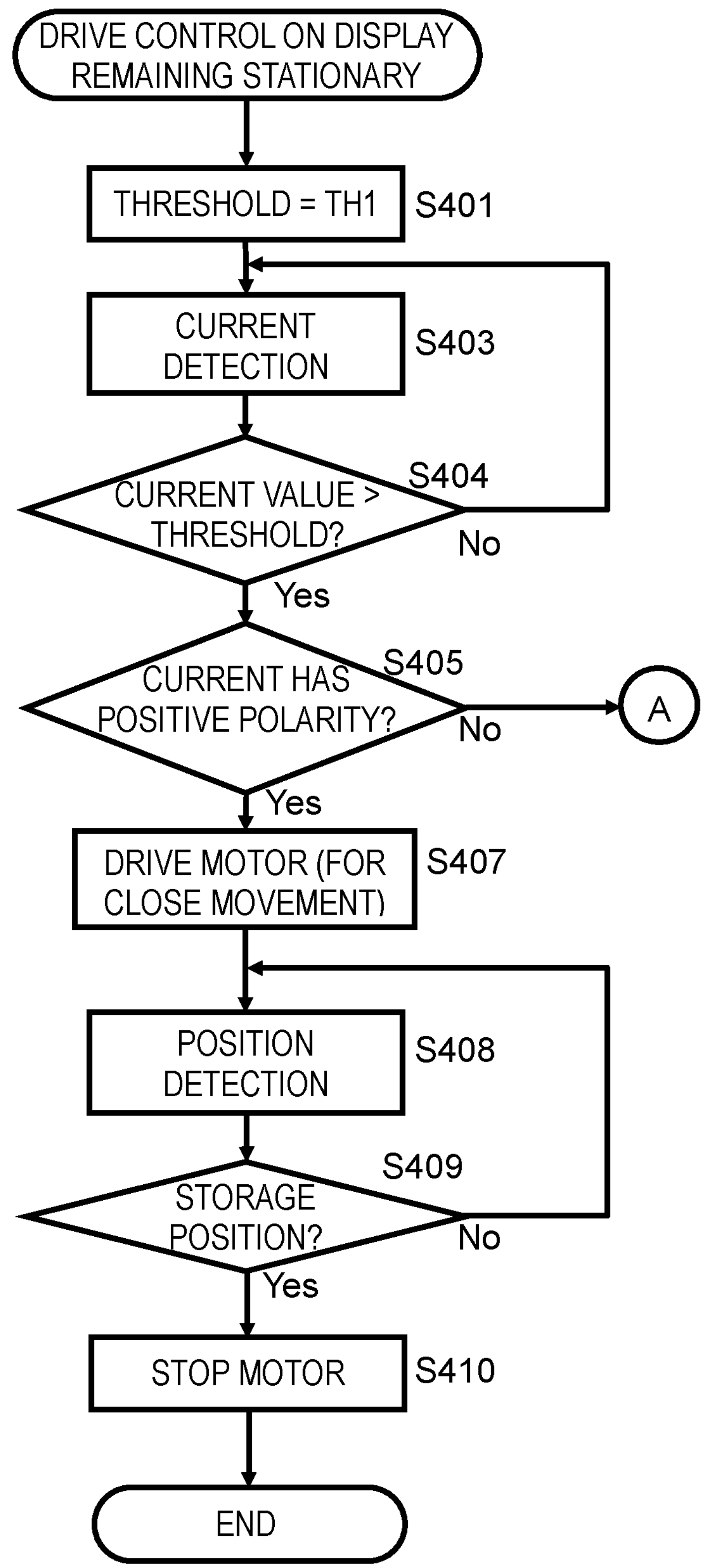
FIG. 4 is a flowchart illustrating the workings of the display unit when the display moves to a stationary position in the close direction.
Figure 5:
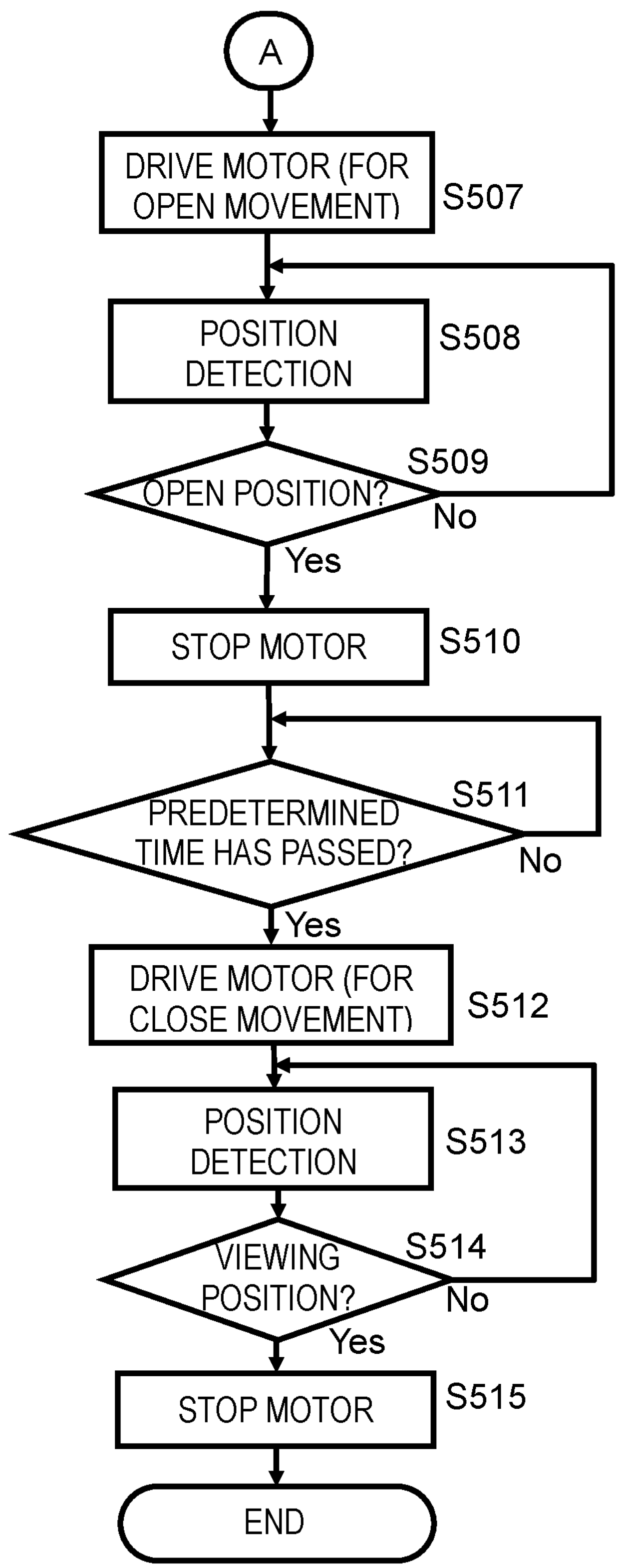
FIG. 5 is a flowchart illustrating the workings of the display unit when the display moves to a stationary position in the open direction.

Next, the operation of the display unit with display 120 remaining stationary at viewing position 122 will be described with reference to each flowchart shown in FIG. 4 and FIG. 5. FIG. 4 is a flowchart illustrating the operation when an external force is applied to display 120 in the close direction during it stays at viewing position 122. FIG. 5 is a flowchart illustrating the operation when an external force is applied to display 120 in the open direction during it stays at viewing position 122.

As shown in FIG. 4, when display 120 stays at viewing position 122 with no instructions from server 200, CPU 180 sets a threshold value of current detected by current detecting circuit 117 to threshold TH1 (in step S401).

The setting way of threshold TH1 will be described below with reference to FIG. 3. When display 120 remains stationary, motor 110 carries no current. However, if an external force is applied to display 120 at time T2, motor 110 has counter electromotive current (i.e., current value I1), as shown in graph C2 of FIG. 3. In the exemplary embodiment, on the assumption that an external force is applied to display 120 remaining stationary at viewing position 122, threshold TH1 is set to a value greater than zero and smaller than current value I1 that generates in response to application of an external force.

During the standstill of display 120, current detecting circuit 117 detects the current that motor 110 carries. CPU 180 reads the current detected by current detecting circuit 117 (in step S403), and compares the current value with threshold TH1 (in step S404). As described earlier, when an external force is applied to display 120 placed at viewing position 122, counter electromotive current (i.e., current value I1) generates in motor 110. At that time, the polarity of current value I1 depends on the direction in which the external force is applied to display 120. In step S404, CPU 180 makes comparison, as magnitude of an absolute value, between current value I1 and threshold TH1.

If the current value detected by current detecting circuit 117 is not more than TH1 (corresponding to 'No' in step S404), the procedure goes back to step S403 and CPU 180 continues current detection.

If the current value detected by current detecting circuit 117 is greater than threshold TH1 (corresponding to 'Yes' in step S404), CPU 180 determines the polarity of the current detected by current detecting circuit 117 (in step S405). In the exemplary embodiment, the current in motor 110 for driving display 120 in the open direction has the positive polarity. FIG. 4 shows the case where an external force in the close direction is applied to display 120 that stays at viewing position 122; accordingly, the current generated at that time is counter electromotive current in the positive direction.

If the current detected by current detecting circuit 117 has the positive polarity (corresponding to 'Yes' in step S405), CPU 180 gives instructions to motor driver 115 to start the close movement of display 120. Receiving the instructions, motor driver 115 starts power supply to motor 110 so that display 120 moves from viewing position 122 to storage position 121. This allows display 120 to start the close movement.

During the close movement of display 120, CPU 180 reads the position of display 120 detected by position detecting sensor 170 (in step S408) and determines whether display 120 has reached storage position 121 or not (in step S409).

If display 120 does not yet reach storage position 121 (corresponding to 'No' in step S409), the procedure goes back to step S408 and CPU 180 continues to detect the position of display 120.

If display has reached storage position 121 (corresponding to 'Yes' in step S409), CPU 180 gives instructions to motor driver 115 so as to stop motor 110 (in step S410). The close movement of display 120 is thus completed.

In the procedures above (i.e., between step S407 and step S409) where display 120 moves in the close direction from viewing position 122 to storage position 121, if current detecting circuit 117 detects a current value in motor 110 greater than threshold TH2 caused by application of an external force in the open direction, CPU 180 may stop the close movement of display 120 and move it to viewing position 122 in the open direction. Waiting for a predetermined period of time after display 120 has reached viewing position 122, display unit 100 may restart the close movement of display 120.

In step S405, if the current detected by current detecting circuit 117 has the negative polarity (corresponding to 'No' in step S405), CPU 180 requests motor driver 115 to start the open movement of display 120 (in step S507 of FIG. 5). Receiving the request, motor driver 115 starts to provide motor 110 with electric power so that display 120 moves from viewing position 122 further in the open direction. In this way, display 120 moves further in the open direction. That is, display unit 100 has a structure where display 120 has a rotation range expanded in the open direction beyond viewing position 122, if an external force in the open direction is applied to display 120 remaining stationary at viewing position 122, display unit 100 performs a predetermined drive control.

During the open movement of display 120, CPU 180 reads the position of display 120 detected by position detecting sensor 170 (in step S508), and determines whether display 120 has reached open position 123 or not (in step S509). If display 120 does not yet reach open position 123 (corresponding to 'No' in step S509), the procedure goes back to step S508 and CPU 180 continues detection of the position of display 120.

If display 120 has reached open position 123 (corresponding to 'Yes' in step S509), CPU 180 gives instructions to motor driver 115 so as to stop motor 110 (in step S510).

Next, CPU 180 monitors a lapse of predetermined time (in step S511). After a predetermined time has passed (corresponding to 'Yes' in step S511), CPU 180 requests motor driver 115 to start the close movement of display 120 (in step S512). Receiving the request, motor driver 115 starts to provide motor 110 with electric power so that display 120 moves in the close direction from open position 123. This allows display 120 to start the close movement in the close direction.

During the close movement of display 120, CPU 180 reads the position of display 120 detected by position detecting sensor 170 (in step S513), and determines whether display 120 has reached viewing position 122 or not (in step S514). If display 120 does not yet reach viewing position 122 (corresponding to 'No' in step S514), the procedure goes back to step S513 and CPU 180 continues detection of the position of display 120.

If display 120 has reached viewing position 122 (corresponding to 'Yes' in step S514), CPU 180 gives instructions to motor driver 115 so as to stop motor 110 (in step S515).

Through the procedure above, the operation—in which an external force is applied to display 120 in the open direction while the display is remaining stationary at viewing position 122—is completed.

In the procedures above (i.e., between step S507 and step S509) where display 120 moves in the open direction from viewing position 122 to open position 123, if current detecting circuit 117 detects a current value in motor 110 greater than threshold TH2 caused by application of an external force in the close direction, the procedure may proceed to step S512 and CPU 180 may perform the close operation. Further, in the procedures above (i.e., between step S512 and step S514) where display 120 moves in the close direction from open position 123 to viewing position 122, if current detecting circuit 117 detects a current value in motor 110 greater than threshold TH2 caused by application of an external force in the open direction, the procedure may go back to step S507 and CPU 180 may perform the open operation again.

3. Effect

As described above, display unit 100 of the exemplary embodiment has main unit 105, display 120, motor 110 for driving display 120, driving state detector 185 for detecting the driving state of motor 110, current detecting circuit 117 for detecting current that motor 110 carries, and CPU 180 for controlling the workings of motor 110. Display 120 is disposed on main unit 105 so as to be movable between viewing position 122 and storage position 121. When current detecting circuit 117 detects a predetermined current value suitable for a driving state detected by driving state detector 185, CPU 180 controls the workings of motor 110 in a predetermined manner.

The predetermined current value in the exemplary embodiment is determined as follows: when driving state detector 185 detects that display 120 remains stationary, the current value is set to be greater than threshold TH1; and when driving state detector 185 detects that display 120 is moving, the current value is set to be greater than threshold TH2.

With the structure above, display unit 100 detects that display 120 is accidentally struck by a person or an object, and requests motor 110 to properly drive display 120, allowing the impact caused by the collision to be effectively reduced.

Other Exemplary Embodiments

The structure described in the first exemplary embodiment is merely an example of the technique of the present disclosure. That is, the technique of the present disclosure is not limited to the structure described above but is applicable to exemplary embodiments with various changes and modifications. Further, a combination of the components described in the first exemplary embodiment may form another structure other than the example described above. Hereinafter, other exemplary embodiments will be described.

According to the description in the first exemplary embodiment, CPU 180 works in the following way; in the close operation of display unit 100, CPU 180 continues current detection and position detection until display 120 has reached storage position 121, but if current detecting circuit 117 detects a current value greater than threshold TH2, CPU 180 switches the close operation into the open operation. However, the drive control is not limited to; CPU 180 may not make decision on comparison between the detected current value and threshold TH2 in the periphery of storage position 121 in the close operation, that is, in the periphery of storage position 121, CPU 180 may continue the close operation regardless of the current detected by current detecting circuit 117.

Such a drive control is on the ground below. That is, if motor 110 further receives electric power after display 120 has reached storage position 121, since display 120 no longer moves ahead, current detecting circuit 117 can detect a current value greater than threshold TH2. Due to the current detection, CPU 180 can incorrectly determine that an external force is applied to display 120. From the reason above, the drive control—where CPU 180 makes no decision on comparison between the current value and the threshold in the periphery of storage position 121—is effective in preventing false detection. The periphery of storage position 121 is, for example, within a range of 5-degree distance from storage position 121 toward viewing position 122.

Similarly, to prevent false detection, CPU 180 may make no decision on comparison between the detected current value and threshold TH2 in the periphery of open position 123. Further, when display 120 has a movable range from storage position 121 to viewing position 122 (i.e., display 120 does not move beyond viewing position 122 in the open direction), it is effective in preventing false detection of CPU 180 by making no decision on comparison between the detected current value and threshold TH2 in the periphery of viewing position 122.

According to the drive control described in the first exemplary embodiment, when display unit 100 detects a current value greater than threshold TH2 during the open operation, it changes the open operation to the close operation; accordingly, display 120 moves to storage position 121. However, display unit 100 may restart the open operation after waiting a predetermined of time since display 120 has reached storage position 121. Similarly, according to the drive control described in the first exemplary embodiment, when display unit 100 detects a current value greater than threshold TH2 during the close operation, it changes the close operation to the open operation; accordingly, display 120 moves to viewing position 122. In that case, too, display unit 100 may restart the close operation after waiting a predetermined of time since display 120 has reached viewing position 122.

Further, display unit 100 may contain a temperature sensor (as an example of a temperature detector) for detecting temperature in the periphery of motor 110. In that case, when the temperature sensor detects a temperature lower than a predetermined temperature, CPU 180 may employ highly-set threshold values TH1 and TH2 for the current detected by current detecting circuit 117. The reason is described below. A low temperature of motor 110 increases viscosity of grease in motor 110, by which the current at rotation can become large. This can cause false detection that an external force is applied to display 120. Employing a temperature sensor allows thresholds TH1, TH2 to be raised for low temperatures, preventing false detection. The predetermined temperature mentioned above is not necessarily fixed to a single value; setting two or more predetermined temperatures allows current thresholds TH1 and TH2 to have a step-by-step change according to the temperature detected by the temperature sensor.

With reference to FIG. 4, the first exemplary embodiment has described the drive control of CPU 180 with display 120 being stationary (specifically, with display 120 being stationary at viewing position 122). CPU 180 may perform the similar drive control when display 120 remains stationary at a certain position, for example, between viewing position 122 and storage position 121. In that case, CPU 180 determines—based on the polarity detected by current detecting circuit 117—the direction in which an external force is applied with respect to the moving direction of display 120, and controls display 120 so that it moves in the direction the external force is applied (i.e., in the direction away from a person or an object having collision with the display). That is, when display 120 undergoes an external force while being stationary at a place between viewing position 122 and storage position 121, CPU 180 performs drive control according to the direction in which the external force is applied. Specifically, if the detected current (as an absolute value) is greater than threshold TH1 as a result of application of external force in the open direction, CPU 180 performs drive control for the open movement of display 120, whereas if the detected current (as an absolute value) is greater than threshold TH1 as a result of application of external force in the close direction, it performs drive control for the close movement.

According to the structure of the first exemplary embodiment, if current detecting circuit 117 detects a current value greater than threshold TH2 during the open movement of display 120, CPU 180 gives instructions to motor driver 115 to start the close movement of display 120, and during the close movement of display 120, CPU 180 determines whether display 120 has reached storage position 121 or not. However, as further possible drive control, CPU 180 may control the movement of display 120 as follows. That is, if current detecting circuit 117 detects a current value greater than threshold TH2 during the close movement, CPU 180 may stop the close movement and restart the open movement; after that, i.e., during the open movement, if a current value greater than threshold TH2 is detected, CPU 180 may request motor driver 115 to start the close movement of display 120. That is, each time a current value (as an absolute value) greater than threshold TH2 during the open/close movement of display 120 is detected, CPU 180 may reverse the movement of the display.

According to the structure described in the first exemplary embodiment, display 120 has a rotational movement with respect to main unit 105, but it is not limited to; display 120 may have a parallel movement with respect to main unit 105. That is, the movement of display 120 includes a rotational movement and a parallel movement. When display 120 has a parallel movement, the direction of the movement is not limited to a fixed direction; it may move in a direction vertical to the screen of display 120 or may move in a direction parallel to the screen.

According to the structure described in the first exemplary embodiment, CPU 180, motor driver 115, and current detecting circuit 117 are accommodated in main unit 105, but it is not limited to; they may be accommodated in display 120.

It will be understood that the structure described above is merely an example of the technique of the present disclosure. That is, the technique of the present disclosure is not limited to the structure described above, allowing modification, replacement, addition, and omission without departing from the spirit and scope of the claimed invention.

INDUSTRIAL APPLICABILITY

The present disclosure is applicable to a display unit having a display whose position is changeable. Specifically, it is applicable to a display unit mounted on a moving vehicle such as an aircraft.

What is claimed is:

1. A display unit comprising:

a main unit;

a display disposed on the main unit so as to be movable between a first position and a first target position;

a motor for driving the display;

a driving state detector for detecting a driving state of the motor;

a current detector for detecting a current value of the motor; and a controller for controlling the driving state of the motor, wherein, when the driving state detector detects that the display remains stationary at the first target position and the current detector detects the current value of the motor is greater than a first threshold, the controller controls the driving state of the motor so that the display moves from the first target position.

2. The display unit according to claim 1, wherein, when the driving state detector detects that the display is moving and the current detector detects the current value of the motor is greater than a second threshold greater than the first threshold, the controller reverses the driving state of the motor.

3. The display unit according to claim 2 further comprising a position detector for detecting a position of the display, wherein, when the position of the display detected by the position detector belongs to a predetermined range from the first position, the controller does not compare the current value of the motor detected by the current detector with the second threshold.

4. The display unit according to claim 2 further comprising a temperature detector for detecting temperature of the motor, wherein, when the temperature detected by the temperature detector is lower than a predetermined temperature, the controller increases the second threshold.

5. The display unit according to claim 1 further comprising a temperature detector for detecting temperature of the motor, wherein, when the temperature detected by the temperature detector is lower than a predetermined temperature, the controller increases the first threshold.

6. The display unit according to claim 1, wherein the display is movable from the first position to a second target position beyond the first target position, and the controller controls the driving state of the motor so that the display moves from the first target position to the first position or the second target position based on a polarity of the current value of the motor detected by the current detector.

7. The display unit according to claim 1, wherein the display is movable from the first position to a second target third position beyond the first target position, and the controller controls the driving state of the motor so that the display moves from the first target position in a direction in which an external force to the display is applied, when the current value of the motor detected by the current detector is greater than the first threshold.

8. A display unit comprising:

a main unit;

a display disposed on the main unit so as to be movable between a first position and a first target position;

a motor for driving the display;

a position detector for detecting a position of the display;

a current detector for detecting a current value of the motor; and a controller for controlling the driving state of the motor, wherein, when the controller determines that the display remains stationary at the first target position based on the position of the display detected by the position detector and the current detector detects the current value of the motor is greater than a first threshold, the controller controls the driving state of the motor so that the display moves from the first target position.

9. The display unit according to claim 8, wherein, when the controller determines that the display is moving based on the position of the display detected by the position detector and the current detector detects the current value of the motor is greater than a second threshold greater than the first threshold, the controller reverses the driving state of the motor.

10. A display unit comprising:

a main unit;

a display disposed on the main unit so as to be movable between a first position and a second position;

a motor for driving the display;

a driving state detector for detecting a driving state of the motor;

a current detector for detecting a current value of the motor; and a controller for controlling the driving state of the motor, wherein the controller:

sets a first threshold corresponding to when the motor is not driven, sets a second threshold, greater than the first threshold, corresponding to when the motor is driven, controls the driving state of the motor so that the display moves from the second position, when the driving state detector detects that the display remains stationary at the second position and the current detector detects the current value of the motor is greater than the first threshold, and reverses the driving state of the motor, when the driving state detector detects that the display is moving and the current detector detects the current value of the motor is greater than the second threshold.

* * * * *